Figures 1, 2:
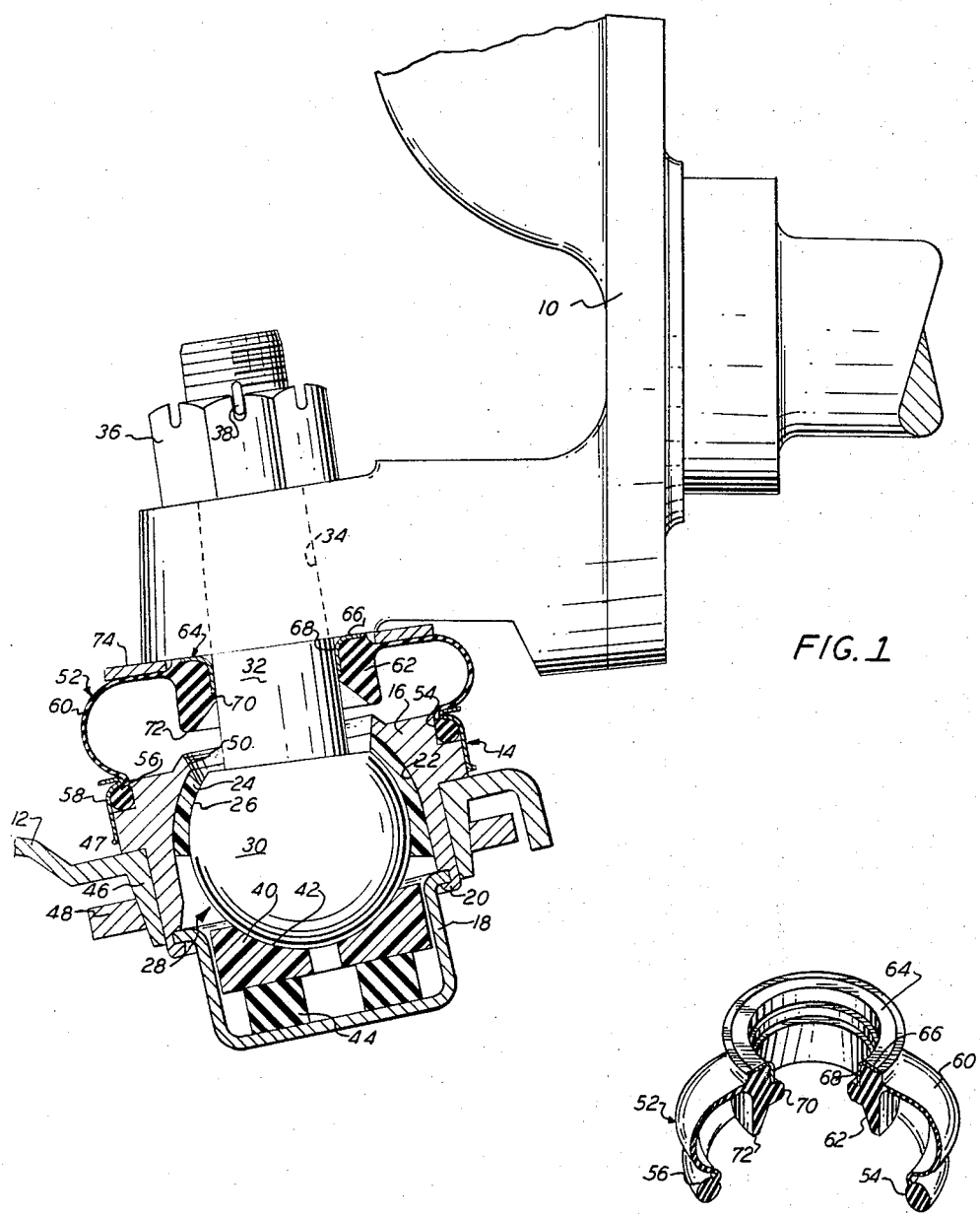

Sept. 26, 1967  R. A. HUSEN  3,343,855
SEAL CONSTRUCTION FOR ARTICULATED JOINTS
Filed Oct. 16, 1964

ROBERT A. HUSEN
INVENTORS
BY John R. Faulkner
Clifford L. Sadler
ATTORNEY

United States Patent Office 3,343,855
Patented Sept. 26, 1967

3,343,855
SEAL CONSTRUCTION FOR ARTICULATED
JOINTS
Robert A. Husen, Livonia, Mich., assignor to Ford Motor
Company, Dearborn, Mich., a corporation of Delaware
Filed Oct. 16, 1964, Ser. No. 404,226
4 Claims. (Cl. 287—90)

The present invention relates generally to seal constructions for articulated joints, and more particularly to the construction of a seal for a ball and socket joint.

Ball and socket joints provide an articulated connection between two relatively movable members. Joints of this type have a number of uses. They are commonly provided in vehicle suspension systems to connect a vehicle suspension arm to a wheel spindle. Ball joints are also used in the steering linkages of vehicles.

A ball joint usually comprises a spherical or semispherical socket and a stud with a one- or two-piece spherical head that is seated in the socket. These joints are lubricated with grease to provide low friction movement. In order to retain the lubricant within the socket and prevent the entry of contaminating dirt that might damage the bearing surfaces, a boot seal is usually provided. A boot seal is often formed of a flexible material, such as rubber, in an annular shape. Such a seal has a small opening at one end that surrounds the stud and a large opening at the other end that surrounds the socket.

In automotive suspension systems, it has become a practice to provide prelubricated ball and socket joints containing a grease of improved quality that will retain good lubricating characteristics for extending usage beyond the heretofore conventional 1000-mile servicing interval. In order to accommodate a ball joint construction having such lubrication, superior means must be provided to retain the grease and prevent its contamination.

In accordance with this need, it is an object of the present invention to provide a boot-type seal for a ball joint having superior sealing characteristics.

More specifically, and in accordance with the preferred embodiment of the present invention, it is an object to provide a seal having one end secured to the socket and the other end secured to the stud of a ball joint assembly. The seal is provided with a thin wall construction so that angular displacement about the axis of the stud permits the body of the seal to flex. By securing the seal ends to the stud and socket, respectively, a positive seal in those areas is assured. A thin wall seal is required to accommodate the angular flexing. Further, in accordance with the present invention a rubber lip extends downwardly from the stud end of the seal toward the open mouth of the socket. This enlarged lip serves to prevent the seal wall from becoming pinched between the stud and the socket upon articulation of the ball joint.

Further objects and advantages of the present invention will be more fully comprehended from the following description and the accompanying drawings, in which:

FIGURE 1 is an elevational view, partly in section, of a portion of a vehicle suspension system having a ball joint and seal construction in accordance with this invention; and FIGURE 2 is a perspective view, partly in section, of the ball joint seal.

Referring now to the drawings for a more complete understanding of the present invention, a ball joint assembly in the environment of a vehicle suspension system is illustrated for exemplary purposes. FIGURE 1 discloses a suspension system which includes a wheel spindle 10 and a suspension arm 12. A ball joint assembly 14 rotatably and tiltably connects the spindle 10 with the suspension arm 12.

The ball joint assembly 14 includes an annular-shaped upper socket part 16 and a cup-shaped lower socket part 18. The socket parts 16 and 18 are secured together by a beaded-over portion 20 formed on one end of the socket 16. Internal surface 22 of the upper socket portion 16 has a generally hemispherical configuration. It is lined by an annular plastic bearing piece 24 which fits against the wall 22 and has an internal bearing surface 26. The bearing surface 26 is also of a generally hemispherical configuration.

A stud 28 has a ball portion 30 that is seated against the bearing surface 26 of the bearing liner 24. A shank portion 32 extends upwardly from the ball portion 30 of the stud 28. The shank 32 fits into a tapered hole 34 formed in the wheel spindle 10 and is held in place by a nut 36 and a cotter key 38.

A second plastic bearing element 40 is situated within the lower socket part 18 and has a bearing surface 42 which slidably engages the lower surface of the ball 30. The bearing element 40 is pressed toward the ball 30 by an annular rubber spring 44.

The suspension arm 10 is provided with an opening having a cylindrical portion 46 which receives the upper socket portion 16. The ball joint socket is press-fitted into the opening formed by the cylindrical wall 46 until a shoulder 47 is seated against the arm 12. The outer surface of the wall 46 is tapered and engaged by a retaining ring 48. The ring 48 is jammed upwardly, forcing the wall inwardly against the socket part 16 to retain it in a tight connection.

The upper end of the socket 16 is provided with a large opening 50 to provide clearance for the shank portion 32 of the stud 28 when the head portion 30 pivots on the bearing surfaces 26 and 42. The opening 50 is sealed by a boot seal assembly 52.

The boot seal assembly 52 has a generally annular configuration with a large opening 54 at its lower end that is defined by a rolled edge 56. The edge 56 is seated in a groove 57 formed on the exterior surface of the upper socket part 16 and is held in tight sealed engagement by a spring metal retainer 58.

The body 60 of the seal is of thin wall construction. In one physical embodiment of the invention, the wall was formed with a thickness of .020 inch. This thin wall 60 bulges outwardly and connects the lower edge 56 with an upper end of the seal 52 that is also of enlarged construction.

The annular enlargement 62 defines the opening of the seal 52 that surrounds the stud shank 32. A hat-shaped washer 64 having a radial flange portion 66 and a cylindrical flange portion 68 is in tight sealed engagement with the adjacent surface of the spindle 10 and the stud 32, respectively. A rib 70 extends radially inwardly at the lower extremities of the flange 68 to provide a tight sealed engagement against the surface of the stud shank 32. The enlargement 62 also includes an enlarged lip or rib 72 that extends downwardly toward the open mouth 50 of the socket 16.

It will be noted from FIGURES 1 and 2 that the thin body portion 60 of the seal 52 intersects the enlarged portion 62 at a substantially right angle and is spaced from its upper edge by a small amount equal to the thickness of a washer 74. The washer 74 is provided to protect the thin body of the seal from being cut by the sharp machined edge of the adjacent portion of the spindle 10.

The upper and lower ends of the seal 52 are secured to the stud 32 and socket 16, respectively, so that when the spindle 10 is rotated about the axis of the stud shank 32 during steering movement of the vehicle wheel, the rubber body portion 60 will flex and twist. Because it is a thin wall seal, this flexing and twisting occurs without injury to the rubber. The enlarged depending lip 72 keeps the seal wall 60 from becoming pinched between the stud 32 and the opening 50 during rotary steering movement of the spindle 10 as well as during vertical jounce and rebound movement.

The seal is particularly distinguishable because it is secured at its upper and lower ends to provide for the positive retention of grease and the prevention of contamination. It is a superior seal because it has long life characteristics resulting from the thin wall construction that permits deflection without tearing or cracking. By providing the depending enlarged lip 72, the wall 60 will not become pinched and bruised.

Modifications and alterations of the present invention may occur to those skilled in the art that will come within the scope and spirit of the following claims.

I claim:

1. A suspension arm, a wheel spindle, a ball joint assembly connecting said arm and said spindle and having a socket part secured to said arm and a stud part secured to said spindle, said spindle having a flat surface generally perpendicular to the axis of said stud and facing said ball joint assembly, an annular flexible boot seal having a large open end secured to said socket part and a small open end secured to said stud part and positioned against said surface, said seal having a thin flexible wall portion connecting said ends, said small open end being defined by an enlarged body portion having a resilient depending annular lip extending toward said socket part and spaced from said stud part, said lip having its axial length so proportioned relative to the overall axial length of the boot that portions of said lip overlap the adjacent terminal edge portions of said socket part upon deflection of said stud part relative to said socket part and prevent pinching of said thin flexible wall between the stud and socket.

2. A suspension arm, a wheel spindle, a ball joint assembly connecting said arm and said spindle and having a socket part secured to said arm and a stud part secured to said spindle, said spindle having a flat surface generally perpendicular to the axis of said stud and facing said ball joint assembly, an annular flexible boot seal having a large open end secured to said socket part for movement therewith and a small open end secured to said stud part for movement therewith and positioned against said surface, said seal having a thin flexible wall portion connecting said ends, said small open end being defined by an enlarged body portion having a resilient annular depending lip extending toward said socket part and spaced from said stud part, said lip having its axial length so proportioned relative to the overall axial length of the boot that portions of said lip overlap the adjacent terminal edge portions of said socket part upon deflection of said stud part relative to said socket part and prevent pinching of said thin flexible wall between the stud and socket, said wall portion intersecting said body portion at a right angle.

3. An annular boot seal for a ball joint assembly having a socket part and a stud part, said seal having a large open end adapted to be secured about said socket part, said seal having a small open end adapted to be secured to said stud part, said seal having a thin flexible wall portion connecting said ends and adapted to flex upon tilting of said stud, said socket part having an opening through which said stud part extends, said small end of said seal defined in part by an enlarged annular resilient depending lip extending into the interior of said boot spaced from the central axis thereof and provided juxtaposed to the opening in said socket part, said lip extending into the boot a sufficient distance so as to prevent pinching of said flexible boot between said stud and the adjacent terminal edge of said socket upon angular deflection of said stud part.

4. A suspension arm, a wheel spindle, a ball joint assembly connecting said arm and said spindle, said joint assembly having a socket part secured to said arm and a stud part secured to said spindle, said socket part having an opening through which said stud part protrudes, said spindle having a flat surface generally perpendicular to the axis of said stud and facing said ball joint assembly, an annular flexible boot seal having a large open end secured to said socket part for rotation therewith and a small open end secured to said stud part for rotation therewith and positioned against said surface, said seal having a thin flexible wall portion connecting said ends, said small open end being defined by an enlarged body portion having a resilient annular depending lip extending toward the opening of said socket part and spaced from said stud part, said lip having its axial length so proportioned relative to the overall axial length of the boot that portions of said lip overlap the adjacent portions of said socket part opening upon deflection of said stud part relative to said socket part and thereby prevent said wall portion from being pinched and bruised between said stud part and the edge of said socket part opening upon such deflection.

References Cited

UNITED STATES PATENTS

| 2,974,975 | 3/1961 | Thomas | 287—90 |
| 3,052,477 | 9/1962 | Parker | 287—90 |
| 3,239,259 | 3/1966 | Dance et al. | 287—87 |

FOREIGN PATENTS

| 662,676 | 12/1951 | Great Britain. |
| 949,966 | 2/1964 | Great Britain. |

CARL W. TOMLIN, *Primary Examiner.*

A. V. KUNDRAT, *Assistant Examiner.*